D. S. STAFFORD.
CULTIVATOR.
No. 68,910.  Patented Sept. 17, 1867.
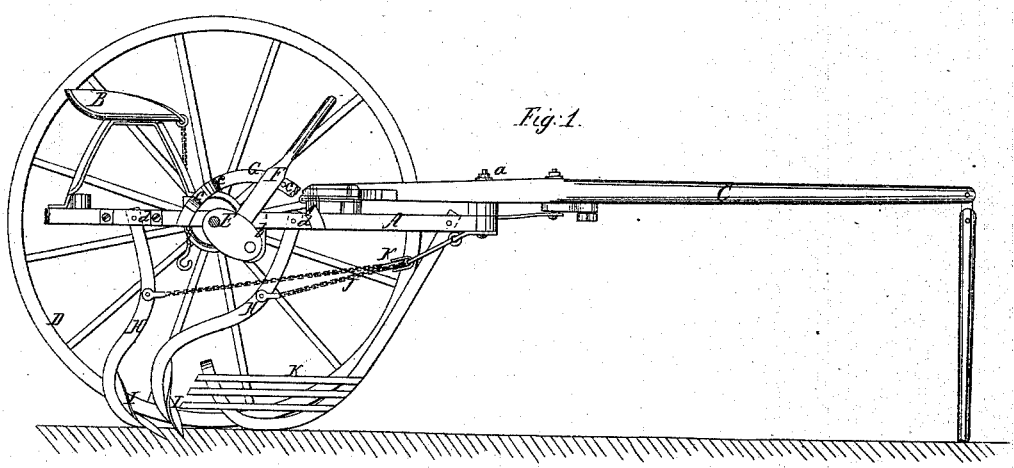
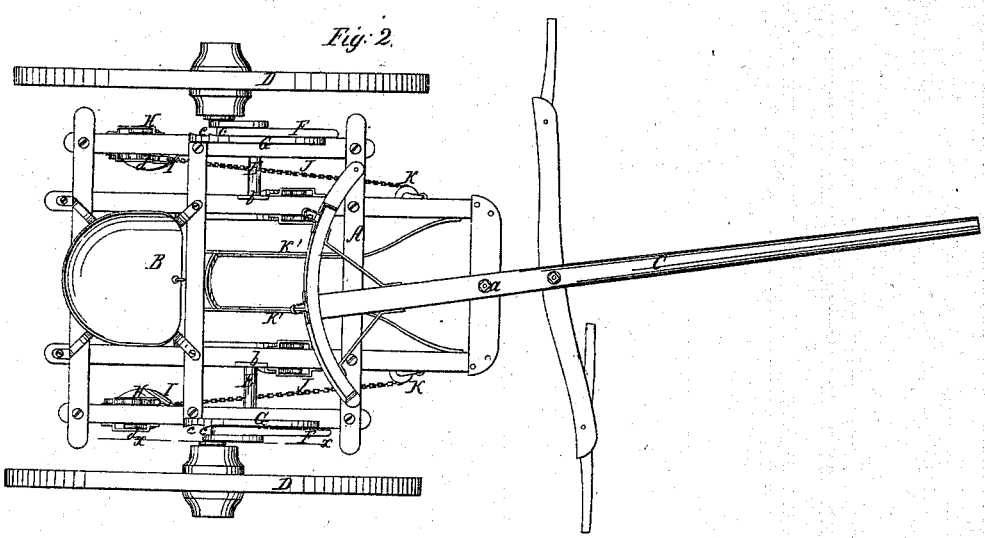

United States Patent Office.

ELIZA STAFFORD, OF DECATUR, ILLINOIS, ADMINISTRATRIX OF THE ESTATE OF DANIEL S. STAFFORD, DECEASED, ASSIGNOR TO HERSELF, SULIVAN BURGESS, AND JOSEPH STAFFORD.

Letters Patent No. 68,910, dated September 17, 1867; antedated August 20, 1867.

IMPROVEMENT IN CULTIVATORS.

The Schedule referred to in these Letters Patent and making part of the same.

TO ALL WHOM IT MAY CONCERN:

Be it known that D. S. STAFFORD, deceased, did, during his lifetime, invent a new and improved Cultivator, and that I, ELIZA STAFFORD, of Decatur, in the county of Macon, and State of Illinois, executrix of the said D. S. STAFFORD, do hereby declare that the following is a full, clear, and exact description thereof, which will enable others skilled in the art to make and use the same, reference being had to the accompanying drawings, forming part of this specification, in which—

Figure 1 is a side sectional view of the invention, taken in the line $x\ x$, fig. 2.

Figure 2, a plan or top view of the same.

Similar letters of reference indicate like parts.

This invention relates to a new and improved cultivator, of that class which are designed for cultivating crops grown in hills or drills. The invention consists in a novel and improved arrangement of crank-axles whereby the ploughs may be adjusted higher or lower, so as to plough more or less deep, as required, and all the ploughs of the machine graduated so as to plough an equal depth. The invention further consists in a novel arrangement of the plough-standards, and in a peculiar shape of the ploughs, whereby the latter are prevented from clogging or choking.

A represents the frame of the machine, having the driver's seat B on its rear end, and a draught-pole, C, attached to it by a pivot-bolt, $a$, to facilitate the turning or guiding of the machine. The frame A is mounted on two wheels D D, the axles E E of which are of crank form and fitted in suitable pendent bearings $b$ attached to the frame A. These axles E E are independent of each other, and each has a lever, F, attached, which levers are within convenient reach of the driver on seat B, and are by the side of upright semicircular bars G, attached one to each side of the frame A, and provided with pins or projections $c$, or both, by which the levers F may be retained at any desired point within the scope of their movement, and the ploughs secured at a greater or less height, according to the depth of furrow required. H represents the plough-standards, the upper ends of which are pivoted to the frame A, as shown at $d$. These standards are of curved form, as shown clearly in fig. 1, and to the lower ends of the standards ploughs I are attached. These ploughs are of oval or elliptical form, and curved so as to cast the earth either towards or from the plants, as may be desired. There are four ploughs in all, two at each side, of the machine, the two front ploughs being nearer together than the two rear ones, and the two standards H H, at each side of the machine, are connected by a chain, J, and these chains pass around pulleys K K, secured to the front part of the frame A. By this arrangement the two ploughs at each side of the machine are allowed to equalize themselves, one plough in case of meeting with an obstruction being made to pull against the other. It will be seen that in consequence of the plough-standards H being attached directly to the frame A, all the ploughs will, as the frame A is raised or lowered, be adjusted higher or lower simultaneously, and all moved precisely the same distance; hence the ploughs will all penetrate into the earth the same depth. By referring to fig. 1 it will be seen that the standards H are curved backward just above the ploughs. This curvature prevents the earth from adhering to the standards, as it must drop off by virtue of its own gravity, there being nothing to hold it, no ledges, shoulders, or angles. The machine is supplied with the guards K', to prevent the front ploughs throwing or casting clods of earth upon the plants. These guards, however, are not new, and may be seen in many machines.

Having thus described my invention, what I claim as new, and desire to secure by Letters Patent, is—

The pivoted curved plough-standards H connected by the chains J, substantially as and for the purpose specified.

ELIZA STAFFORD.

Witnesses:
S. BURGESS,
H. B. DURFEE.